United States Patent [19]

Dorph

[11] 3,855,720
[45] Dec. 24, 1974

[54] AUTOMATIC LINE RELEASE FOR SPIN FISHING EQUIPMENT

[76] Inventor: Thor Dorph, 120 Ellis St., Apt. 101, San Francisco, Calif. 94102

[22] Filed: Dec. 26, 1972

[21] Appl. No.: 318,272

[52] U.S. Cl. .................................................. 43/25
[51] Int. Cl............................................. A01k 87/00
[58] Field of Search .............. 43/25, 25.2, 19, 19.2, 43/24

[56] References Cited
UNITED STATES PATENTS

| 2,843,963 | 7/1958 | Butehorn | 43/25 |
| 2,846,804 | 8/1958 | Elliott | 43/25 |
| 3,057,106 | 10/1962 | Wheeler | 43/25 |
| 3,296,732 | 1/1967 | Magnus | 43/25 X |
| 3,436,858 | 4/1969 | Shaffer | 43/19 |

FOREIGN PATENTS OR APPLICATIONS

| 589,584 | 12/1959 | Canada | 43/25 |

Primary Examiner—Warner H. Camp
Attorney, Agent, or Firm—Kemon, Palmer & Estabrook

[57] ABSTRACT

An automatic line release mechanism is attached to the handle of a spinning rod and includes a pivotally mounted trigger which holds the line between the reel and the first line guide prior to making a cast. The trigger member is pivoted to a line releasing position automatically by linkage connected to the rod and responsive to bending of the rod and tension in the line during the cast.

4 Claims, 7 Drawing Figures

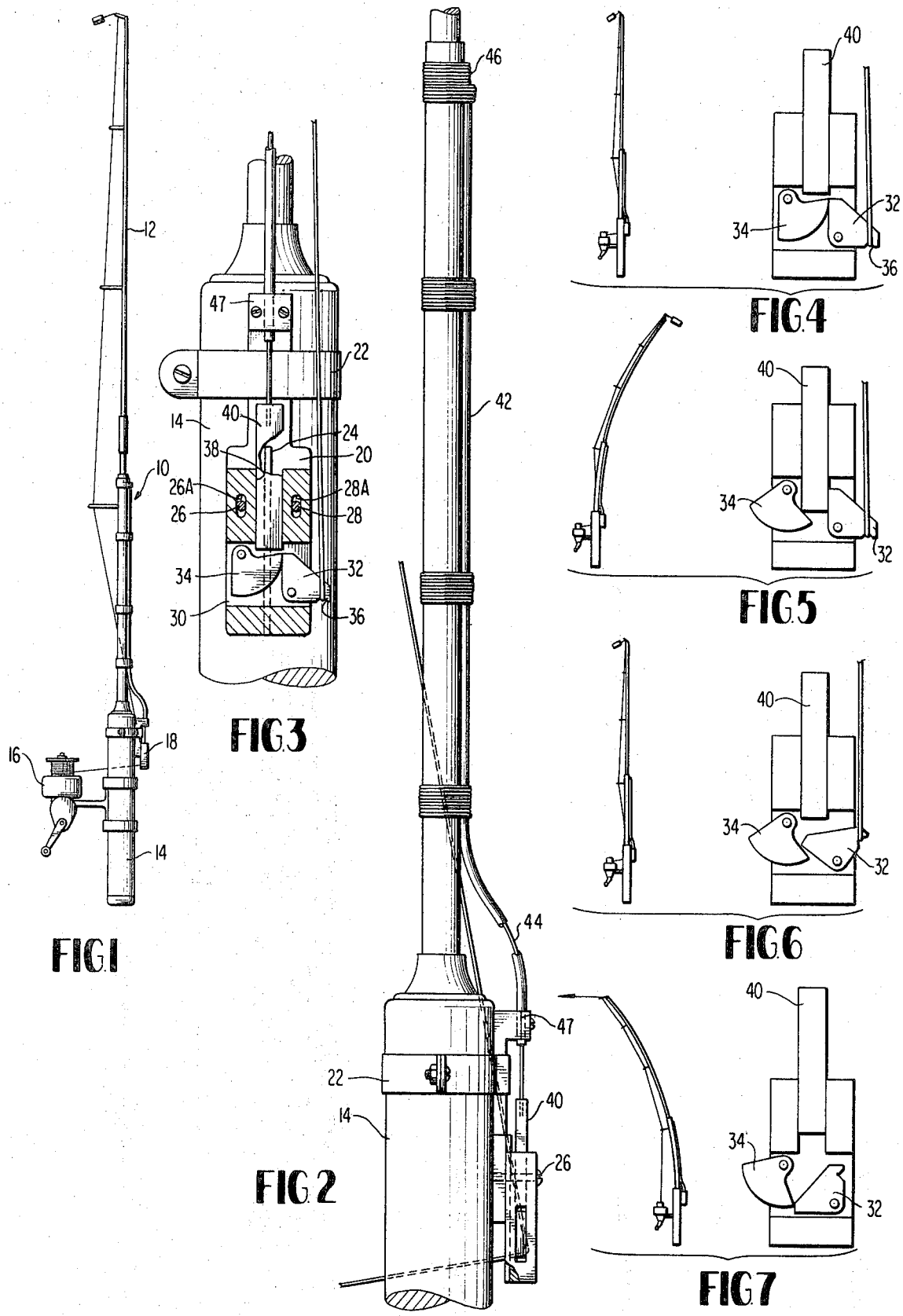

3,855,720

1

AUTOMATIC LINE RELEASE FOR SPIN FISHING EQUIPMENT

BACKGROUND OF THE INVENTION

Casting with a spinning rod and reel requires the angler to hold the line between the reel and the first line guide, usually with the tip of the index finger of the casting hand, and to release it at exactly the proper moment for maximum accuracy or distance. The time of release is something which is learned only by experience, because of certain variable factors such as the "action" of the rod, the weight of the lure, the size and stretch characteristics of the line, etc. and changing any of these changes the proper moment of release. Thus a person being used to a given outfit, even it moderately experienced, will have difficulty to readjust if any of the variable factors or combinations thereof are changed. Accordingly, it is the principal object of the present invention to provide a simple low cost lightweight attachment for a spinning rod which removes all guesswork from casting by automatically releasing the line at the proper moment during the forward cast.

Previous attempts to solve this particular problem include mechanical devices which hold the line but which still must be manually released during the cast. Essentially, such devices are useful only primarily to reduce wear and tear on the finger of the caster by substituting a mechanical finger for a human one. Automatic line release means have also been attempted and one example is shown in U.S. Pat. No. 3,050,898 dated Aug. 28, 1962. The line release means shown in that patent is relatively large rendering the outfit somewhat cumbersome. In addition, this prior art device apparently fails to appreciate or take into account all of the variable factors which affect the proper time for release.

BRIEF SUMMARY OF THE INVENTION

The apparatus of the present invention includes a small compact housing which attaches to the handle of the rod and includes a trigger member pivotally mounted in the housing to pivot between a first position extending at least partially out of the housing and a second position received substantially entirely within the housing. When in the position exterior of the housing, the edge of the trigger which faces the butt of the rod has a notch for receiving the line. The line is stretched between the reel and the first rod guide and entrained over the notch. A second pivotal member received within the housing is effective to cam the trigger member to its position outside of the housing. An elongated member one end of which is secured to the rod at a point spaced forwardly from the handle responds to bending of the rod during the back and fore cast positions to first lengthen and then shorten. The opposite end of this member is connected to a reciprocating bar mounted within the housing so that on the back cast the bar approaches the butt of the rod and pushes the cam member out of the path of pivotal movement of the trigger member. On the forward case of the rod, the bar moves forwardly along the rod and the tension in the line pivots the trigger member to its position within the housing thereby releasing the line at the proper moment during the fore cast.

2

BRIEF DESCRIPTION OF THE DRAWINGS

FIG. 1 is a side elevation of a spinning rod and reel showing the general arrangement of line release mechanism as applied to the rod handle and rod itself;

FIG. 2 is an enlarged view of a portion of FIG. 1;

FIG. 3 is a plan view partially in section showing the mounting of the trigger mechanism on the handle of the rod; and FIGS. 4, 5 and 6 and 7 are diagramatic views showing the relationship of the parts of the release mechanism to the movements of the rod during the making of a cast.

DETAILED DESCRIPTION OF THE DRAWINGS

Referring first to FIGS. 1, 2 and 3, FIG. 1 is a side elevational view of a conventional spinning rod and reel identified generally by the reference numeral 10 and including tip and handle portions 12 and 14 and a spinning reel 16 attached to the handle 14. A housing 18 is attached to the handle 14 on the side opposite the reel 16 and slightly forwardly of the reel. The details of mounting the housing 18 are shown most clearly in FIGS. 2 and 3. A base plate 20 is rigidly secured to the handle 14 by any convenient means shown for example as a split clamp 22. On the upper surface of the base plate 20 there is a spline 24 to engage with a corresponding slot in the housing 18 for alignment purposes. The housing 18 in turn is adjustably secured to the base plate by a pair of mounting screws 26 and 28 which extend through a pair of complimentary slots 26A and 28A in the housing 18. An open sided chamber 30 is formed in the rear of the housing to accomodate a pivoted trigger member 32 and a pivoted cam 34. The trigger 32 includes a line receiving notch 36 which faces the butt of the rod in the position shown in FIG. 3. A second chamber 38 communicates with the chamber 30 and opens through the forward end of the housing 18. Slidably mounted in this chamber is a bar member 40.

Referring more particularly now to FIG. 2, a Bowden wire or similar device 42 extends along and is secured to the rod. The inner wire 44 is securely attached at its forward end as indicated by the wrapping 46 in FIG. 2. The opposite end of the wire member 44 is secured to the sliding block member 40. At the forward end of the base plate 20, a clamping means 47 is provided for securing the outer casing of the wire 44 to the base plate. The clamping is such of course that the wire 44 is free to move through the clamp to cause reciprocation of the bar member 40 for reasons which will be explained herein after.

Referring now to FIGS. 4 to 7 inclusive, these figures show the relationship of parts contained in the housing 18 at the various stages of making a cast. In FIG. 4, the parts occupy the same positions as shown in FIG. 3 which corresponds to an unflexed condition of the rod preparatory to making a cast. In FIG. 5, the rod has been flexed by the weight of the lure during the back cast and this has the effect of shortening the rod between the point 46 where the outer end of the Bowden wire is attached and the butt of the rod. The result is that the wire 44 is placed in compression and its lower end moves downwardly thereby moving the bar 40 to the position shown in FIG. 5. It should be noted in this figure that the block in moving downwardly retains the trigger 32 in the position shown in FIG. 4 but it moves the cam 34 about its pivot point and away from the trigger 32. In FIG. 6 the rod has returned to upright unflexed position and consequently the bar member 40 has returned to its starting position as illustrated in FIG. 4. Tension on the line due to the weight of the lure however has begun to pivot the trigger in a counterclockwise direction as shown in FIG. 6 and continued forward movement of the rod to the position shown in FIG. 7 in which the bend is substantially the reverse of that shown in FIG. 5 results in complete release of the line from the notch 36 on the trigger member 32 and the trigger member pivots entirely within the housing 18. Since the rod has assumed a reverse flexed position from that shown in FIG. 5, the wire 44 has been placed under tension and the distance between its point of attachment to the rod and the butt of the rod has been lengthened and therefore the bar member 40 moved forwardly and completely clear of the chamber 30 as shown in FIG. 7. Once the line has been retrieved and before making another cast, the angler merely pushes the cam 34 to the position shown in FIG. 4 and trains the line from the reel over the notch 36 in the trigger 32 as shown in FIG. 4.

Proper adjustment of the mechanism is achieved by loosening the screws 26 and 28 which permits the housing 18 to slide on the spline 24 until reaching the proper position and the screws are then re-tightened.

From the foregoing it will be apparent to those skilled in this art that there is herein disclosed and described a new and useful automatic line release device for spinning rods which is effective to release the line at the precise moment of casting to achieve maximum accuracy and/or distance. While a preferred embodiment has been herein shown and described, applicant claims the benefit of a full range of equivalents within the scope of the appended claims.

I claim:

1. In combination with a spinning rod and reel, an automatic line release device comprising:
    a housing firmly attached to the handle of said rod on the opposite side of and forwardly of said reel;
    a trigger mounted in said housing to pivot from a first position within said housing to a second position extending outwardly of said housing and having a line receiving notch in that side of said trigger which faces the butt of said rod when in said second position so that line between said reel and the first guide on said rod may be placed in said notch;
    cam means mounted in said housing for holding said trigger in said second position prior to making a cast; and
    means connected to and responsive to bending of said rod during casting for disabling said cam means but blocking movement of said trigger until said rod approaches a straight position to permit said trigger to move to said first position to release the line automatically at the proper moment.

2. The combination defined by claim 1 in which said last mentioned means includes an elongated member having one end secured to a point on said rod spaced toward the tip thereof from the handle, and a member slidably mounted in said housing and connected to the other end of said elongated member so as to disable said cam means when in its position nearest the butt of said rod.

3. The combination defined by claim 1 in which said cam means is pivotally mounted in said housing and movable from a first position where it cams said trigger to its second position, and a second position out of the path of movement of said trigger from its second to its first position.

4. In combination with a spinning rod and reel, an automatic line holding release mechanism for use when casting comprising:
    a housing mounted on the handle of said rod on the opposite side from and forwardly of said reel;
    a trigger member having a line receiving notch therein, pivotally mounted in said housing to rotate between a first position in which said notch is outside said housing facing the butt of said rod and a second position entirely within said housing;
    a cam member pivotally mounted in said housing on an axis parallel to the axis of said trigger member to rotate between a first position in which said trigger member is cammed into its first position and a second position clear of the path of movement of said trigger member from its first to its second position;
    a bar member mounted in said housing for sliding movement parallel to said rod, said bar member when moving from its forward most to its rear most position engaging said cam member and moving it out of the path of travel of said trigger from its first to its second position; and
    means connected to said rod and said bar member and responsive to bending of said rod during casting movement to move said bar to its rear most position on the back cast and to its forward most position on the fore cast, whereby line between said reel and the first guide of said rod entrained in the notch of said trigger is automatically released at the proper time.

* * * * *